United States Patent
Petschulat et al.

(10) Patent No.: US 9,980,347 B2
(45) Date of Patent: May 22, 2018

(54) LIGHTING SYSTEM AND METHOD FOR CONTROLLING A LIGHTING SYSTEM

(71) Applicant: ZUMTOBEL LIGHTING GMBH, Dornbirn (AT)

(72) Inventors: Manfred Petschulat, Wolfurt (AT); Sebastian Schubnell, Kressbronn (DE)

(73) Assignee: ZUMTOBEL LIGHTING GMBH (AT)

( * ) Notice: Subject to any disclaimer, the term of this patent is extended or adjusted under 35 U.S.C. 154(b) by 0 days. days.

(21) Appl. No.: 15/122,529

(22) PCT Filed: Mar. 26, 2015

(86) PCT No.: PCT/EP2015/056537
§ 371 (c)(1),
(2) Date: Aug. 30, 2016

(87) PCT Pub. No.: WO2015/144817
PCT Pub. Date: Oct. 1, 2015

(65) Prior Publication Data
US 2017/0071046 A1   Mar. 9, 2017

(30) Foreign Application Priority Data
Mar. 27, 2014   (DE) .................. 10 2014 205 761

(51) Int. Cl.
| H05B 37/02 | (2006.01) |
| F21S 8/02 | (2006.01) |
| F21S 8/04 | (2006.01) |

(52) U.S. Cl.
CPC ..... *H05B 37/0227* (2013.01); *H05B 37/0218* (2013.01); *F21S 8/026* (2013.01);
(Continued)

(58) Field of Classification Search
CPC .......................... H05B 37/02; H05B 37/0218; H05B 37/0227; H05B 37/0281; Y02B 20/40; Y02B 20/44; F21S 10/02; F21S 10/023
(Continued)

(56) References Cited

U.S. PATENT DOCUMENTS

| 5,592,052 A * | 1/1997 | Maya ...................... H01J 61/44 |
| | | 313/485 |
| 5,668,446 A | 9/1997 | Baker |

(Continued)

FOREIGN PATENT DOCUMENTS

| DE | 102009016753 | 10/2010 |
| DE | 102012208951 | 8/2013 |

(Continued)

OTHER PUBLICATIONS

International Search Report in parent application PCT/EP2015/056537 dated Sep. 17, 2015.
(Continued)

*Primary Examiner* — Jason M Crawford
(74) *Attorney, Agent, or Firm* — Andrus Intellectual Property Law, LLP (57) ABSTRACT

The invention relates to a lighting system for lighting a space (R) which lighting system has means (4) for producing space illumination over a large area, and means (5) for producing concentrated local lighting. Furthermore the lighting system has a presence detector (6) for detecting the presence of at least one person (P) in the space (R) and a control device (8) for controlling the means (4) for producing the space illumination and the means (5) for producing the local lighting. To this end the control device (8) is configured to control the space illumination over a large area automatically as a function of the daylight or as a function of the daytime and to control the local lighting automatically as a function of the (Continued)

presence of at least one person (P) in the space (R). Because the space illumination is controlled automatically as a function of the daylight or of the daytime, the illumination can be prevented from being reduced so much that a lighting mood is produced which has a negative effect. Nevertheless the lighting system can be controlled advantageously n energy terms, in particular since the local lighting can be controlled as a function of the presence of persons in the space.

17 Claims, 4 Drawing Sheets

(52) U.S. Cl.
CPC ............... *F21S 8/04* (2013.01); *Y02B 20/44* (2013.01); *Y02B 20/46* (2013.01)

(58) Field of Classification Search
USPC .......................... 315/149–155; 362/235–248
See application file for complete search history.

(56) References Cited

U.S. PATENT DOCUMENTS

| | | | |
|---|---|---|---|
| 2007/0185675 A1 | 8/2007 | Papamichael et al. | |
| 2009/0251058 A1* | 10/2009 | Chen | H05B 37/0218 315/159 |
| 2010/0277080 A1* | 11/2010 | Waffenschmidt | H05B 37/0245 315/152 |
| 2011/0031897 A1* | 2/2011 | Henig | H05B 37/0254 315/297 |
| 2012/0007511 A1* | 1/2012 | Choong | H05B 37/0245 315/152 |
| 2012/0038291 A1* | 2/2012 | Hasnain | H05B 33/0857 315/294 |
| 2012/0063138 A1* | 3/2012 | Leadford | F21S 2/005 362/249.02 |
| 2012/0153840 A1* | 6/2012 | Dahlen | H05B 37/0218 315/152 |
| 2012/0217882 A1* | 8/2012 | Wong | F21V 23/0464 315/185 R |
| 2012/0235579 A1* | 9/2012 | Chemel | F21S 2/005 315/152 |
| 2013/0020883 A1* | 1/2013 | Ashoff | H05B 35/00 307/116 |
| 2013/0099674 A1* | 4/2013 | Ferren | H05B 37/0227 315/152 |
| 2014/0043810 A1* | 2/2014 | Jo | F21V 13/04 362/235 |
| 2014/0055041 A1* | 2/2014 | Ramer | H05B 37/0209 315/153 |
| 2014/0070724 A1* | 3/2014 | Gould | H05B 37/02 315/291 |
| 2014/0160754 A1* | 6/2014 | Lee | H01L 25/0753 362/237 |
| 2014/0218909 A1* | 8/2014 | Tetsuo | F21V 5/043 362/231 |
| 2014/0312779 A1* | 10/2014 | Vissenberg | H05B 33/0851 315/152 |
| 2015/0208486 A1* | 7/2015 | Yoon | H05B 37/0227 315/153 |
| 2015/0289347 A1* | 10/2015 | Baaijens | H05B 37/0227 315/294 |
| 2016/0262238 A1* | 9/2016 | Moriwaki | H05B 33/0854 |

FOREIGN PATENT DOCUMENTS

| | | |
|---|---|---|
| EP | 2375129 | 10/2011 |
| WO | 2011039688 | 4/2011 |
| WO | 2011039690 | 4/2011 |
| WO | 2012123352 | 9/2012 |
| WO | 2012129243 | 9/2012 |
| WO | 2013057644 | 4/2013 |

OTHER PUBLICATIONS

Germany Search Report in application 10 2014 205 761.2 dated Jan. 19, 2015.
Austria Search Report in co-pending application GM 319/2014 dated Jan. 20, 2016.

* cited by examiner

Fig. 3c

LIGHTING SYSTEM AND METHOD FOR CONTROLLING A LIGHTING SYSTEM

CROSS REFERENCE TO RELATED APPLICATION

The present application is the U.S. national stage application of International Application PCT/EP2015/056537, filed Mar. 26, 2015, which international application was published on Oct. 1, 2015 as International Publication WO 2015/144817 A1. The International Application claims priority of German Patent Application 10 2014 205 761.2, filed Mar. 27, 2014.

FIELD OF THE INVENTION

The invention relates to a lighting system for lighting a room, and a method for controlling such a lighting system.

BACKGROUND

A ceiling lamp for lighting a room is distributed by the applicant under the name "Mildes Licht" [English: "soft light"]. With this lamp, on one hand, an illumination of a ceiling region can be obtained, and on the other hand, a work area can be directly lit on a local basis. For controlling the light it is provided thereby that the lighting of the ceiling region is reduced by dimming when the work area is sufficiently lit by daylight. This may lead to the ceiling region appearing to be comparatively dark, such that, as a result, a negative mood may be triggered in a person located in the room.

SUMMARY OF THE INVENTION

The basic objective of the invention is to provide an improved lighting system in this regard, and an improved method for controlling such a lighting system. In particular, it should be possible with the lighting system, or the method, respectively, to generate a particularly positive lighting effect with an overall more energy-efficient use thereof.

The invention achieves this objective as discussed below.

In accordance with the invention, a lighting system for lighting a room is provided, having means for generating an overall room illumination, as well as means for generating a concentrated, local illumination. Furthermore, the lighting system has a presence detection device for detecting the presence of at least one person in the room, and a control device for activating the means for generating the room illumination, and the means for generating the local illumination. The control device is designed thereby to control the overall room illumination automatically, as a function of the daylight or the time of day, and to control the local illumination automatically, as a function of the presence of at least one person in the room.

Because the room illumination is automatically controlled as a function of the daylight or the time of day, respectively, it is possible to avoid the lighting of the room becoming so strongly reduced that a lighting atmosphere having a negative effect results. Furthermore, the lighting system can be controlled advantageously in terms of energy consumption, in particular because the local lighting can be controlled as a function of the presence of persons in the room.

Preferably, the means for generating the room illumination are also designed thereby to generate an overall light output from a ceiling region of the room, wherein the means for generating the local lighting are designed to generate a working light in numerous sub-regions located beneath the ceiling region. By lighting the ceiling region, it is possible to obtain, in general, a particularly advantageous lighting effect on the mood or the disposition of a person present in the room.

Preferably, the presence detection device is also designed thereby to determine whether at least one person is present in at least one of the sub-regions, and if so, in which sub-region, or sub-regions, respectively, wherein the design further comprises: the means for generating the local illumination are controlled such that only that sub-region in which at least one person is present is lit, or, if applicable, only those sub-regions in which at least one person is present are lit. As a result, a particularly high energy saving potential can be achieved. In particular, the design is preferably also such that: the means for generating the local illumination remain deactivated as long as nobody is present in at least one of the sub-regions.

Furthermore, the lighting system preferably has a daylight detection device for detecting the intensity of daylight occurring in the room, wherein the design further comprises: the means for generating the local illumination remain activated as long as at least one person is present in at least one of the sub-regions, and the intensity of the daylight remains below a threshold value thereby, and remain deactivated as long as the intensity of the daylight exceeds the threshold value. As a result, an even greater energy savings can be obtained.

The means for generating the room illumination are furthermore preferably designed thereby to generate the room illumination in different intensities, wherein the design further comprises: the means for generating the room illumination are controlled such that with an increasing intensity of the daylight, the room illumination is generated with increasing intensity. As a result, a particularly positive effect on the atmosphere can be obtained as a result of the room illumination.

Preferably the means for generating the room illumination are furthermore designed to generate the room illumination in different color temperatures, wherein the daylight detection device is furthermore designed to detect a color temperature of the daylight, and wherein the design further comprises: the means for generating the room illumination are furthermore controlled such that with an increase in the color temperature of the daylight, the room illumination is generated with an increasing color temperature. As a result of this selection of the color temperature for the room illumination, the latter can be particularly well adapted to the daylight in terms of its effect.

The means for generating the local illumination are furthermore also advantageously designed thereby to generate the local illumination in different color temperatures, wherein the design further comprises: the means for generating the local illumination are furthermore controlled such that with an increase in the color temperature of the daylight, the local illumination is generated with an increase in color temperature. As a result, the effect of the local illumination can also be particularly well adapted to that of the daylight.

In accordance with another aspect of the invention, a method for controlling a lighting system for lighting a room is provided, having the following steps: a) detection of whether a person is present in the room, b) activation of means for generating an overall ceiling lighting, and of means for generating a concentrated, local illumination, wherein the overall room illumination is controlled automatically as a function of the daylight or the time of day, and the local illumination is controlled automatically as a function of the presence of at least one person in the room.

Because the room illumination is automatically controlled as a function of the daylight or the time of day, respectively, it is possible to avoid the lighting being so strongly reduced that a negative lighting atmosphere results. Accordingly, a particularly advantageous control in terms of energy consumption can be achieved, because the local illumination can be controlled as a function of the presence of persons in the room.

It is furthermore advantageous with respect to energy consumption that the means for generating the local illumination are preferably designed thereby to generate a working light in at least one of numerous sub-regions located beneath a ceiling region of the room, wherein the means for generating the local illumination are controlled such that only that sub-region in which the at least one person is present is illuminated, or if applicable, only those sub-regions in which at least one person is present are illuminated. In particular, the means for generating the local illumination preferably also remain deactivated as long as nobody is present in at least one of the sub-regions.

Furthermore, the intensity of daylight present in the room is preferably detected, wherein the means for generating the local illumination remain activated as long as at least one person is present in at least one of the sub-regions and the intensity of the daylight remains below a threshold value thereby, and remain deactivated as long as the intensity of the daylight exceeds the threshold value. The means for generating the room illumination are furthermore preferably controlled such that with an increasing intensity of the daylight, the room illumination is generated with increased intensity.

Preferably, a color temperature of the daylight present in the room is also detected, wherein the means for generating the room illumination are furthermore controlled such that with an increase in the color temperature of the daylight, the room illumination is generated with an increasing color temperature.

Preferably the means for generating the local illumination are furthermore controlled such that with an increase in the color temperature of the daylight, the local illumination is generated with an increasing color temperature.

BRIEF DESCRIPTION OF THE DRAWINGS

The invention shall be explained in greater detail below based on an exemplary embodiment and with reference to the drawings. Therein.

DETAILED DESCRIPTION

Figure 1:
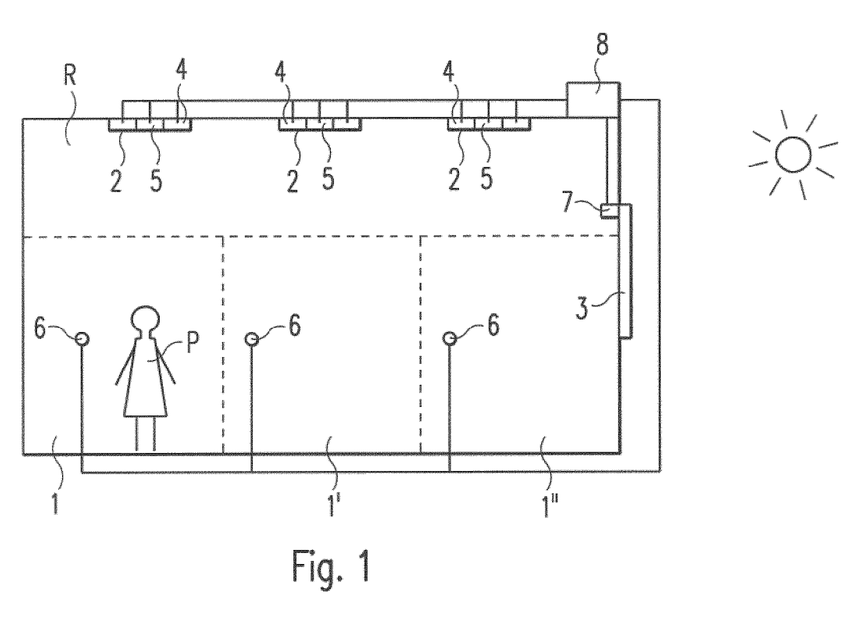
FIG. 1 shows a schematic drawing of a lighting system according to the invention for lighting a room.

FIG. 1 shows a schematic drawing of a lighting system according to the invention for lighting a room R. The room R can be a large room, having numerous work areas, or which is sub-divided into numerous work areas. By way of example, a workspace can be provided in each of the work areas. The room R can be, for example, an open-plan office or a classroom, or the like.

The lighting system comprises means 4 for generating an overall room lighting. These can be designed, in particular, to generate an overall light output from a ceiling region 2 of the room R.

The ceiling region 2 can be the entire ceiling region of the room R, in particular, or it can comprise a sub-region of at least 50% of the entire ceiling region of the room R.

The means 4 for generating the room illumination can also be designed to furthermore illuminate a wall region at the sides thereof, and/or a floor region of the room 3.

Furthermore, the lighting system comprises means 5 for generating a concentrated, local illumination 5. These can be designed, in particular, to generate a working light or workspace lighting in at least one of numerous sub-regions 1, 1', 1" of the room R located beneath the ceiling region 2. By way of example, each of the sub-regions 1, 1', 1" can comprise precisely one work area.

In particular, the means 5 for generating the local illumination 5 can furthermore be designed to generate a working light, or work area lighting, respectively, in each of the sub-regions 1, 1', 1", independently of one another.

The lighting system is accordingly designed to emit light of two different types. For this, a somewhat less intense, but more overall light generation is provided for the room illumination, and a smaller but more intense light generation is provided for the local illumination, in particular an illumination with which each of the workspaces can be illuminated independently of the rest of the workspaces.

Furthermore, the lighting system comprises a presence detection device 6 for detecting the presence of a person P in the room R.

Furthermore, the lighting system comprises a control device 8 for controlling the means 4 for generating the room illumination, and the means 5 for generating the local illumination.

The control device 8 is designed to automatically activate the overall room illumination as a function of daylight or as a function of the time of day, and to automatically activate the local illumination as a function of the presence of at least one person P in the room R. In the example shown herein, the presence detection device 6 is furthermore advantageously designed to detect whether at least one person P is present in at least one of the sub-regions 1, 1', 1", and if so, in which sub-region 1, 1', 1", or if applicable, in which of the sub-regions 1, 1', 1", respectively. The room R can be divided entirely into the sub-regions 1, 1', 1", such that it is possible to determine whether a person P is present in the room R with the presence detection device.

In particular, the control device 8 is designed to activate the means 4 for generating the room illumination independently of the means 5 for generating the local illumination.

The control device 8 is furthermore designed such that the means 5 for generating the local illumination are activated such that only that sub-region 1, 1', 1" is illuminated in which at least one person P is present, or if applicable, those sub-regions 1, 1', 1" are illuminated in which at least one person P is present. The control device 8 is accordingly connected advantageously to the presence detection device 6 for data transmission in this regard.

In particular, it can be designed such that the activation of the means 4 for generating the room illumination occurs independently of whether a person P is in the room R, or in a sub-region 1, 1', 1", or whether numerous persons P are in the room R, or in a sub-region 1, 1', 1", respectively.

As a matter of course, it may furthermore be provided, advantageously in terms of energy consumption, that the means 4 for generating the room illumination are deactivated when nobody is in the room R, or in one of the sub-regions 1, 1', 1", and also remain deactivated as long as this is the case.

In the example shown herein, the presence detection device 6 comprises presence sensors, by means of which it can be determined whether a person is located in a sub-region 1, 1', 1", and if applicable, in which of the sub-regions 1, 1', 1" said person is located. By way of example, precisely one of the presence sensors may be provided for this in each of the sub-regions 1, 1', 1".

Advantageously in terms of energy consumption, it is provided that, for the control, the means 5 for generating the local illumination remain deactivated, or switched off, as long as there is nobody in at least one of the sub-regions 1, 1', 1".

In the example shown herein, the lighting system furthermore comprises a daylight detection device 7, e.g. in the form of a light sensor, for detecting a daylight that may be present in the room R. The design for the control is such that the means 5 for generating the local illumination remain activated as long as at least one person is present in at least one of the sub-regions 1, 1', 1" and the intensity of the daylight remains below a threshold value thereby. If, however, the intensity of the daylight exceeds the threshold value, the means 5 for generating the local illumination remain deactivated. This is advantageous in terms of energy consumption.

The threshold value is accordingly preferably established such that there is light present at each of the workspaces, which is bright enough for working, e.g. writing or reading, when the intensity of the daylight lies above the threshold value.

Furthermore, the means 4 for generating the room illumination are preferably designed to generate the room illumination in different intensities, wherein the means 4 for generating the room illumination are activated such that, with an increasing intensity of the daylight, the room illumination is generated with increased intensity, such that the intensity of the daylight is "reproduced" by the means 4 for generating the room illumination.

By activating the means 4 for generating the room illumination, it is possible to prevent, in particular, the room R appearing as a "dark cavern" when only one workspace is lit, or only a small portion of the work areas are lit.

Similarly, it can furthermore be provided that the means 4 for generating the room illumination are also designed to generate the room illumination in different color temperatures, wherein the daylight detection device is also designed to determine the color temperature of the daylight. The means 4 for generating the room illumination are furthermore activated thereby such that with an increase in the color temperature of the daylight, the room illumination is generated with an increase in the color temperature. Consequently, an effect of the room illumination can be generated, in particular, that "reproduces" the effect of the daylight.

The means 5 for generating the local illumination can also be designed to generate the local illumination in different color temperatures, wherein the means 5 for generating the local illumination are furthermore activated such that with an increase in the color temperature of the daylight, the local illumination is generated with an increase in the color temperature.

With the lighting system designed in this manner, or the control thereof designed in this manner, the energy consumption for the system can thus be kept low, and accordingly, a positive effect on the well-being of the persons present in the room R can be achieved. In particular, the comparatively energy intensive local illumination is only emitted when desired due to the currently prevailing brightness and the presence of one or more persons. The less intense, overall room illumination, conversely, is then emitted, in particular, when only a few of the workspaces are lit with the means for generating the local illumination, e.g. later in the day in an open-plan office, when comparatively few workspaces are occupied. As a result, a positive room atmosphere can be obtained.

Figure 2A:
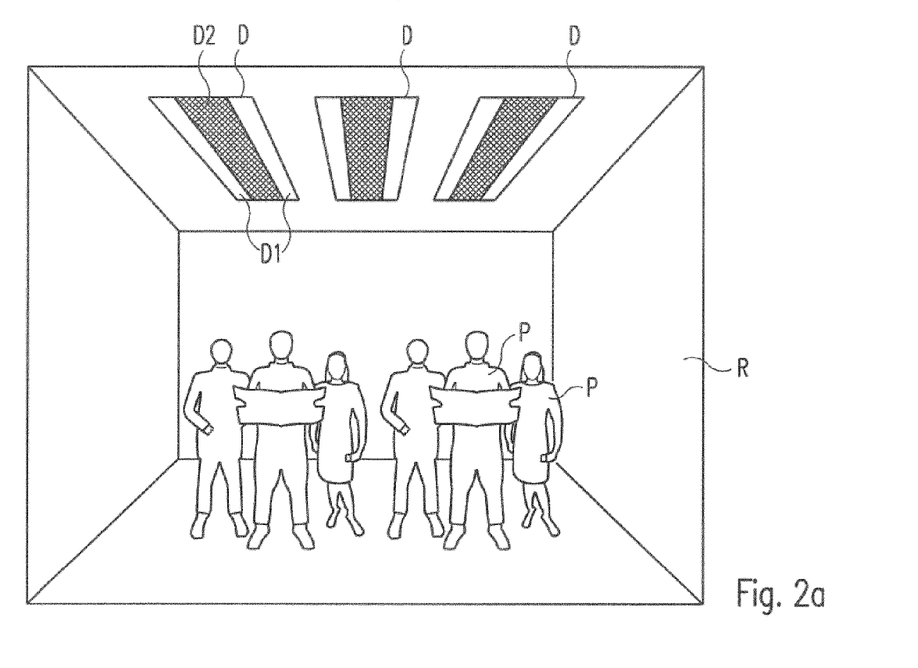
FIG. 2a shows a schematic drawing of the room with numerous persons present therein.
Figure 2B:
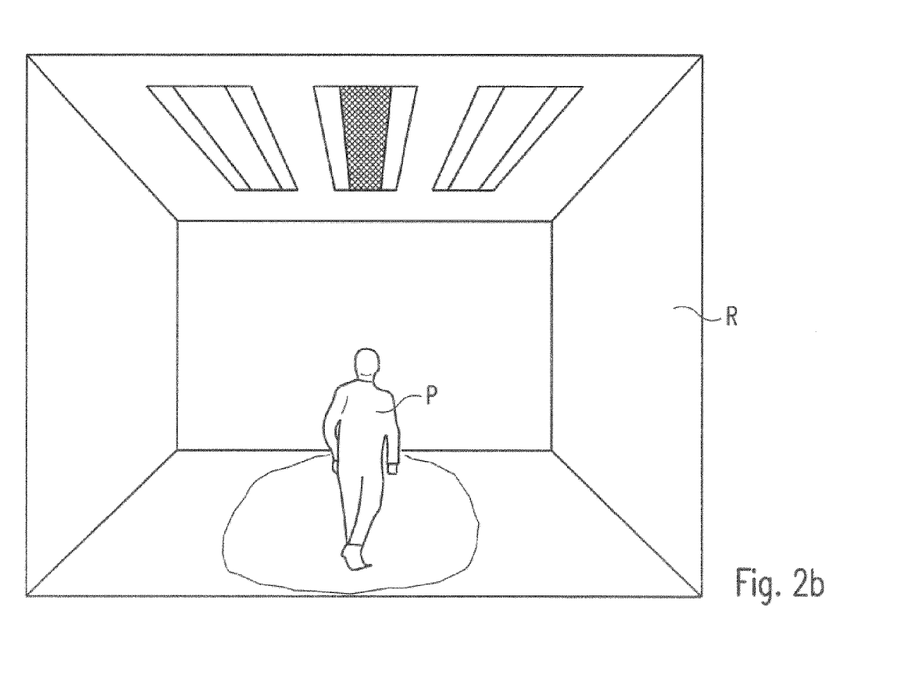
FIG. 2b shows a schematic drawing of the room with only one person present therein.
Figure 2C:
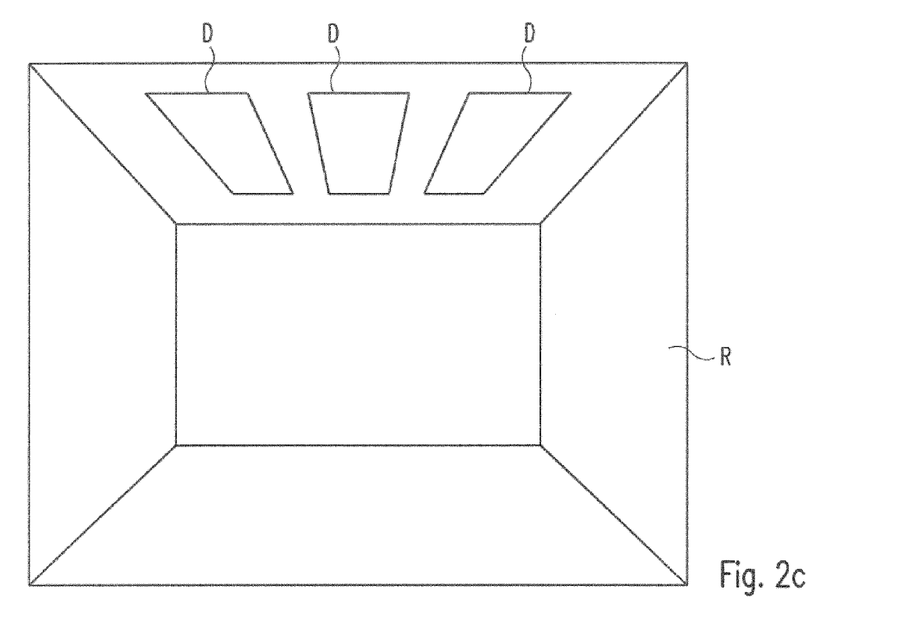
FIG. 2c shows a schematic drawing of the room without anybody present therein.

Schematic drawings of the room R are shown in FIGS. 2*a* to 2*c*, in different lighting situations. FIG. 2*a* shows a case in which numerous persons P are present in the room R, and, accordingly, numerous work areas, or workspaces, are illuminated by the means 5 for generating the local illumination. As is indicated in the drawing, the design can be such that the means 4 for generating the room illumination and the means 5 for generating the local illumination can be implemented by means of numerous ceiling lamps D, e.g. three ceiling lamps in the drawing, wherein preferably each of the ceiling lamps D has a first light emission region D1, over which the light for generating the room illumination is emitted, and a second light emission region D2, over which the light for generating the local illumination is emitted.

The second light emission region D2 can represent a sub-region of the first light emission region D1 thereby. By way of example, the first light emission region D1 can be elongated, as indicated in the drawing, and the second light emission region D2 can be defined by a likewise elongated central sub-region of the first light emission region D1.

The ceiling lamps D can, for example, be lamps that are built into the ceiling, or installed on the ceiling. Fundamentally, it may also be provided, for the lighting system, that individual lamps are used, which emit the light in the two different ways. The concept can, however, also be applied to larger lighting systems, which may be composed of numerous, potentially different, lamps.

The room R is drawn in FIG. 2*b* with one person P present. Accordingly, only one workspace is illuminated, by the ceiling lamp D in the middle in the example shown therein. The two ceiling lamps D on either side therefore emit no light for generating a local illumination via the second light emission region D2. However, all three ceiling lamps D emit light for generating the room illumination.

The room R is drawn in FIG. 2*c* without persons. The three ceiling lamps D are controlled accordingly, such that the means 5 for generating the local illumination are deactivated, and thus no light is emitted over the second light emission region D2 for generating a local illumination.

Figure 3A:
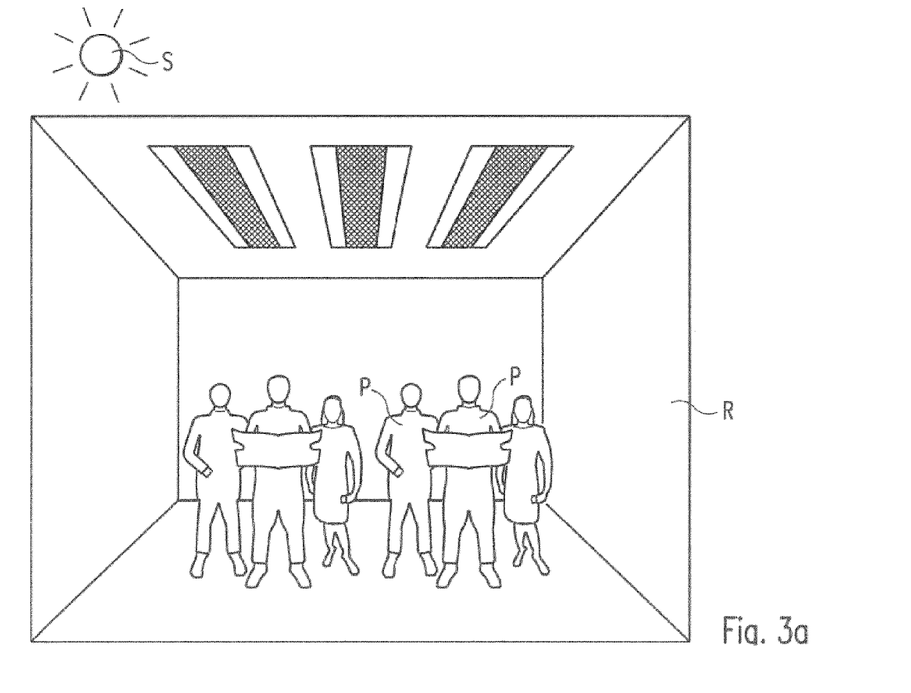
FIG. 3a shows a schematic drawing of the room with numerous persons present therein, wherein a control of the lighting system as a function of the daylight is provided.

A corresponding schematic drawing of the room R is shown in FIG. 3*a*, with numerous persons P present therein, wherein a control of the lighting system that is a function of the daylight is provided, as is represented symbolically by a sun S.

Figure 3B:
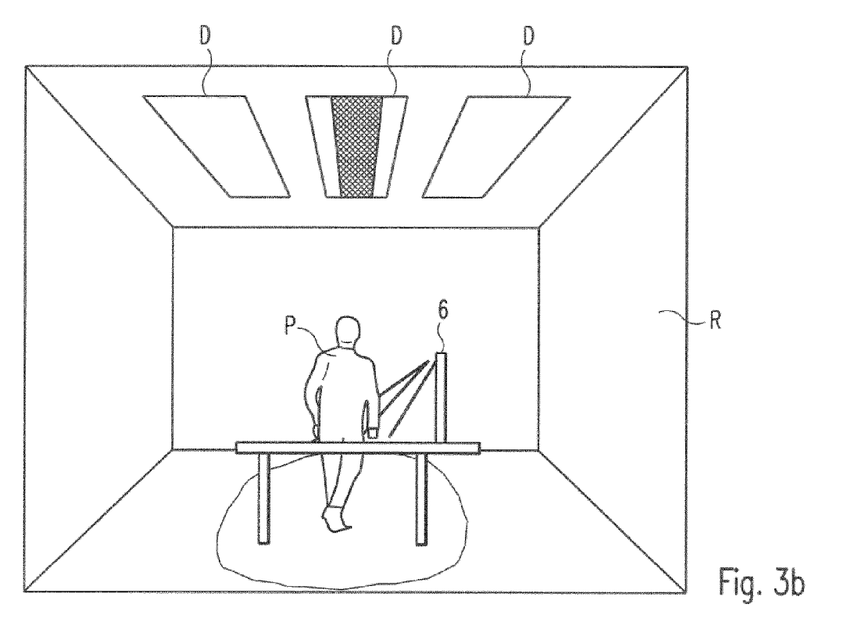
FIG. 3b shows a schematic drawing of the room with a person present therein, who is detected by the presence detection device.

FIG. 3*b* shows a schematic drawing of the room R with a person P present therein. The presence of the person P is detected by means of a presence sensor, which is a component of the presence detection device 6. The sub-region in which the person P is located is furthermore determined by means of the presence detection device 6; this information is transmitted from the presence detection device 6 to the control device 8. The means 5 for generating the local illumination are then activated by the latter, such that a working light is generated in that sub-region in which the person is located. No work light is generated in the other sub-regions in which nobody is present. Accordingly, the activation here is such that the means 5 for generating the local illumination are only activated in one of the three ceiling lamps D, in this case the middle ceiling lamp.

Figure 3C:
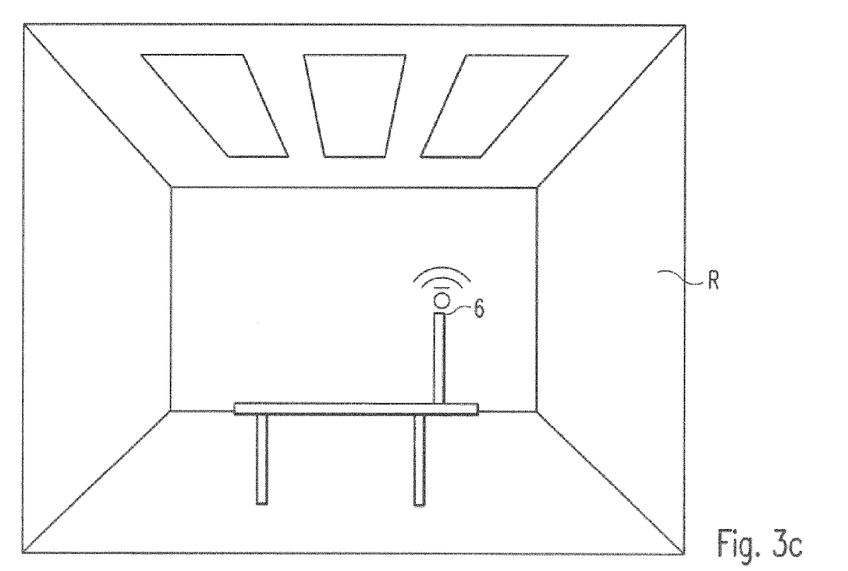
FIG. 3c shows a schematic drawing of the room with a presence detection device, without anybody present therein.

FIG. 3c shows a corresponding drawing, which shows the room R without anyone present. It can be determined by means of the presence detection device 6 that there is nobody in any of the sub-regions, in particular, that there are no persons P in the room R.

What is claimed is:

1. A lighting system for lighting a room (R), comprising means (4) for generating overall room illumination;
    multiple means (5) for generating concentrated, local illumination for multiple sub-regions in the room (R);
    multiple presence detection devices (6), wherein each presence detection device is associated with one of the sub-regions and detects a presence of at least one person (P) in the associated sub-region in the room (R); and
    a control device (8) for activating the means (4) for generating the room illumination and the multiple means (5) for generating the local illumination;
        wherein the control device (8) is configured to activate the means for generating the overall room illumination automatically, as a function of daylight or as a function of the time of day, and independently of the activation of the multiple means for generating concentrated local illumination; and
        further wherein the control device is configured to activate each of the multiple means for generating concentrated local illumination independently of the other means for generating concentrated local illumination and automatically as a function of the presence of at least one person (P) in the associated sub-region in the room (R).

2. The lighting system according to claim 1, wherein the means (4) for generating overall room illumination are controlled to generate an overall light output from a ceiling region (2) of the room (R), and the multiple means (5) for generating the local illumination are controlled to generate working light in at least one of numerous sub-regions (1, 1', 1") located beneath the ceiling region (2) of the room (R).

3. The lighting system according to claim 2, wherein each means (5) for generating the local illumination is activated such that only the associated sub-region (1, 1', 1") is illuminated in which at least one person (P) is present, or if applicable, only those sub-regions (1, 1', 1") are illuminated in which at least one person (P) is present.

4. The lighting system according to claim 3, wherein each means (5) for generating the local illumination remain deactivated as long as nobody (P) is present in the associated sub-regions (1, 1', 1").

5. The lighting system according to claim 2, further comprising
    a daylight detection device (7) for determining an intensity of a daylight present in the room (R), wherein the multiple means for generating the local illumination remain activated as long as at least one person (P) is present in at least one of the sub-regions (1, 1', 1"), and the intensity of the daylight remains below a threshold value and remain deactivated as long as the intensity of the daylight exceeds the threshold value.

6. The lighting system according to claim 1, further comprising a daylight detection device (7) for determining an intensity of the daylight present in the room (R), wherein the means (4) for generating the overall room illumination are controlled to generate the room illumination in different intensities, and wherein the means (4) for generating the room illumination are activated such that with an increase in the intensity of the daylight, the room illumination is generated with an increased intensity.

7. The lighting system according to claim 1, further comprising a daylight detection device (7) for determining an intensity of the daylight present in the room (R), wherein the means (4) for generating the overall room illumination are controlled to generate the room illumination in different color temperatures, and wherein the daylight detection device (7) is configured to determine a color temperature of the daylight, and further wherein the means (4) for generating the room illumination are activated such that with an increase in the detected color temperature of the daylight, the room illumination is generated with an increased color temperature.

8. The lighting system according to claim 7, wherein the means (5) for generating the local illumination are controlled to generate the local illumination in different color temperatures, and wherein the means (5) for generating the local illumination are activated such that with an increase in the color temperature of the daylight, the local illumination is generated with an increased color temperature.

9. The lighting system according to claim 1 wherein the local illumination area for each sub-region is smaller with more intense light than the overall room illumination.

10. A method for controlling a lighting system for lighting a room (R), comprising the following steps:
    a) providing means (4) for generating overall room illumination;
    b) providing multiple means (5) for generating concentrated, local illumination in sub-regions in the room (R), where each means for generating concentrated local illumination is associated with a sub-region in the room;
    c) automatically activating means (4) for generating overall room illumination as a function of daylight or as a function of the time of day;
    d) determining whether at least one person (P) is present in each of the sub-regions of the room (R);
    e) automatically activating each of the means (5) for generating concentrated, local illumination independently of activating the other means for generating concentrated, local illumination and as a function of the presence of at least one person (P) in the associated sub-region in the room (R);
    wherein the means for generating overall room illumination is automatically activated independently of whether any of the multiple means for generating concentrated, local illumination are automatically activated.

11. The method according to claim 10, wherein the respective means (5) for generating the local illumination are controlled to generate working light in least one of numerous sub-regions (1, 1', 1") located beneath a ceiling region (2) of the room (R), and wherein the respective means (5) for generating the local illumination are activated such that only that sub-region (1, 1', 1") in which the at least one person (P) is present is illuminated, or if applicable, only those sub-regions (1, 1', 1") in which the at least one person (P) is located are illuminated.

12. The method according to claim 11, wherein the respective means (5) for generating the local illumination remain deactivated as long as nobody (P) is present in the associated sub-region (1, 1', 1").

13. The method according to claim 11, further comprising the step of determining the intensity of the daylight in the room (R), and wherein the respective means (5) for generating the local illumination remain activated as long as at least one person (P) is present in the sub-regions (1, 1', 1") and the intensity of the daylight remains below a threshold value, and remain deactivated if the intensity of the daylight exceeds the threshold value.

14. The method according to claim 10, further comprising the step of determining the intensity of the daylight in the room (R), wherein the means (4) for generating the overall room illumination are activated such that with an increase in the intensity of the daylight, the room illumination is generated with an increased intensity.

15. The method according to claim 14, further comprising determining the color temperature of the daylight present in the room (R), and wherein the means (4) for generating the room illumination are activated such that with an increase in the color temperature of the daylight, the room illumination is generated with an increased color temperature.

16. The method according to claim 15, wherein the respective means (5) for generating the local illumination are activated such that with an increase in the color temperature of the daylight, the local illumination is generated with an increased color temperature.

17. The method according to claim 11 wherein the local illumination area for each sub-region is smaller with more intense light than the overall room illumination.

* * * * *

UNITED STATES PATENT AND TRADEMARK OFFICE
CERTIFICATE OF CORRECTION

PATENT NO. : 9,980,347 B2
APPLICATION NO. : 15/122529
DATED : May 22, 2018
INVENTOR(S) : Manfred Petschulat and Sebastian Schubnell Page 1 of 1

It is certified that error appears in the above-identified patent and that said Letters Patent is hereby corrected as shown below:

In the Claims

In Claim 13, at Column 9, Line 9: insert -- at least one of -- after "least one person (P) is present in" and before "the sub-regions (1, 1', 1")"

Signed and Sealed this
Thirty-first Day of July, 2018

Andrei Iancu
*Director of the United States Patent and Trademark Office*